UNITED STATES PATENT OFFICE.

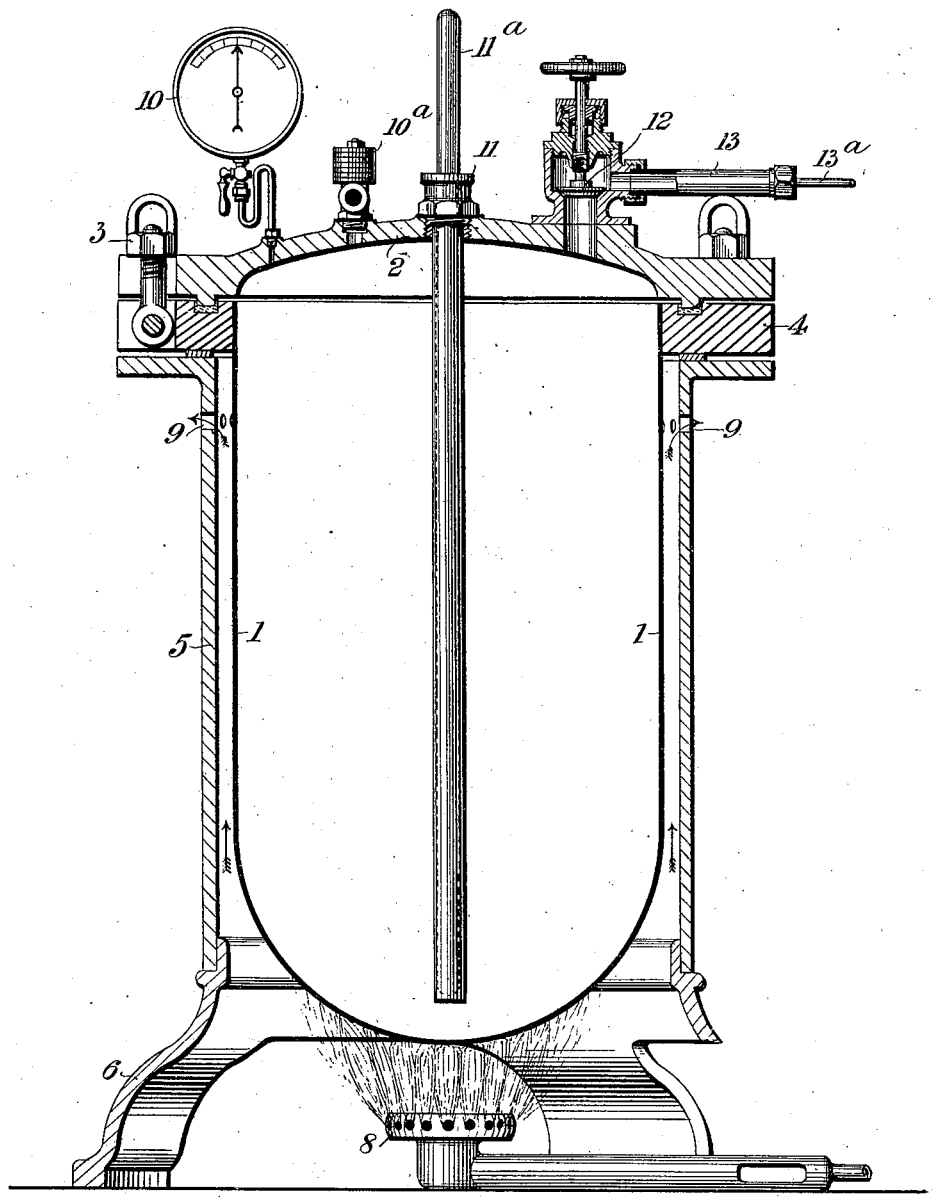

JEAN JOSEPH AUGUSTE TRILLAT, OF PARIS, FRANCE, ASSIGNOR TO THE SOCIÉTÉ CHIMIQUE DES USINES DU RHÔNE ANCIENNEMENT GILLIARD, P. MONNET ET CARTIER, OF LYONS, FRANCE.

PROCESS OF PRODUCING FORMALDEHYDE VAPORS.

SPECIFICATION forming part of Letters Patent No. 656,061, dated August 14, 1900.

Application filed November 24, 1896. Serial No. 613,270. (No specimens.)

*To all whom it may concern:*

Be it known that I, JEAN JOSEPH AUGUSTE TRILLAT, a citizen of the Republic of France, and a resident of Paris, France, have invented certain new and useful Improvements in the Production of Vapors of Formic Aldehyde, (for which I have obtained patents in Great Britain, No. 19,744, dated February 5, 1896, and No. 20,773, dated February 25, 1896; in France, No. 252,939, dated February 5, 1896, (Certificat d'Addition,) and No. 252,939, dated February 25, 1896, (Certificat d'Addition;) in Belgium, No. 122,120, dated June 24, 1896; in Austria, No. 46/175, dated August 12, 1896; in Brazil, No. 2,110, dated August 26, 1896; in Italy, No. 42,078, dated September 30, 1896; in Germany, No. 91,712, dated May 21, 1896; in Denmark, No. 1,176, dated July 1, 1896; in Spain, No. 19,289, dated July 1, 1896; in Hungary, No. 6,312, dated July 2, 1896; in Norway, No. 9,176, dated July 2, 1896; in Russia, No. 395, dated June 25 and July 7, 1896, and in the South African Republic, No. 1,244, dated November 4, 1896,) of which the following is a specification.

This invention relates to the production of vapors of formic aldehyde, and particularly for disinfecting purposes.

Up to the present time no means have been found of generating in an efficient manner the vapors of formic aldehyde from its commercial forty-per-cent. solution, commonly known as "formalin" or "formol." The most simple process would evidently be to heat the solution in the open air, so as to drive off the vapors; but an insurmountable obstacle is met in the fact that polymerization takes place rapidly in the solution, and the solution is finally transformed into a solid substance, which, although more or less volatilizable at higher temperatures, has not the antiseptic activity of the non-polymerized formic-aldehyde vapors. This explains the want of success experienced up to the present in the application of formic aldehyde to the purposes of general disinfection.

The invention provides an improved mode or process of producing formic-aldehyde vapors from a substance containing formic aldehyde—that is to say, a composition of matter adapted to evolve formic-aldehyde vapors as a solution of formic aldehyde or a substance containing it either in polymerized or unpolymerized condition.

The improved mode or process preferably consists in treating or heating a substance containing formic aldehyde under pressure and discharging the compressed vapors. Preferably the forty-per-cent. commercial solution known as "formalin" or "formol," in which the formic aldehyde gas is dissolved in water, is used as the source of formic aldehyde and is confined in a suitable vessel, where it is subjected to heat and pressure, but any other suitable source of formic aldehyde may be employed.

In most substances containing formic aldehyde there will be found both polymerized and unpolymerized formaldehyde, and the application of heat ordinarily will hasten polymerization. In aqueous solutions of formic aldehyde the aqueous vapors will sometimes be evolved with the gas. For practical disinfection the best advantages are obtainable with a non-polymerized and non-aqueous gas. My invention aims to attain a gas having both these advantageous conditions, to provide simple and effective means for producing such gas commercially, so that it can be readily generated and employed where required for disinfecting purposes, and to provide means for evolving practically all of the gas existing in the source of supply, preventing its polymerization and depolymerizing its polymers, so that the cost of disinfection with this gas is reduced by avoidance of the loss of a large proportion of the gas heretofore lost by polymerization and by discharging the gas in the best possible condition for disinfection. Subjecting the gas to pressure during heating both prevents polymerization and depolymerizes existing polymers of formic aldehyde, and the pressure, when an aqueous solution is used as the source of supply for the gas, prevents the evolving of aqueous vapors with the gas by raising the boiling-point of the solution, according to the pressure it is subjected to, so that during the evolution of the gas no steam is thrown off with it. The pressure is preferably generated from the source of supply itself by evolving the gases therefrom by heat and confining the gases evolved until the pressure desired is obtained, whereupon the gases can be released in suitable quantities to maintain or vary this pressure as desired or the pressure may be regulated by regulating the heat.

In order to effect the heating of the formic-aldehyde solution under pressure and the discharging of the compressed vapors in accordance with my invention, I employ a formogenic autoclave, which may conveniently be a simple digester capable of withstanding a pressure of from five to six atmospheres and which can be rapidly heated by some means.

The accompanying drawing represents a central vertical section showing the construction and arrangement of the digester which I find most suitable.

In the drawing, 1 is a strong flanged vessel, of copper, provided with a strong removable gun-metal flanged cover 2 with india-rubber-ring packing adapted to be closed hermetically by means of hinged bolts 3. The vessel 1 rests, by means of its flange 4, inside an outer sheet-metal casing 5, which is supported on feet 6. A rose Bunsen burner 8 serves to heat the vessel 1, or a petroleum or alcohol lamp that permits of rapid heating may be employed. The hot gases of combustion pass up between the vessel 1 and the casing 5 and escape through holes 9. The apparatus is provided with a pressure-gage 10, a safety-valve $10^a$, a copper thermometer-tube casing 11, (in which may be inserted a thermometer $11^a$, with iron shield-casing,) and a screw-down stop-valve 12, all mounted on the cover 2. The screw-down valve is fitted with an outlet-pipe 13, to which may be adapted a flexible copper tube $13^a$ of small bore to allow the discharge of the formic-aldehyde vapors into a closed room or compartment which is to be disinfected through a small aperture, such as the keyhole of the door thereof, the autoclave itself being preferably situated outside the room or compartment.

In order to effect the generation of the formic-aldehyde vapor from the commercial solution, the latter is placed in the digester and the pressure increased by heating to three or four atmospheres. At this point and without ceasing to apply heat the valve 12, which controls the escape-tube 13, is opened. The aldehyde gas is discharged into the room or compartment in the form of a vapor pure and free from polymerization products. If the temperature and pressure are maintained sufficiently high, the complete transformation of the whole of the formic aldehyde in the autoclave into vapor is quickly obtained. Even when the heat is regulated to keep the pressure at, say, two atmospheres the transformation may be effected, but the generation of the aldehyde vapors is necessarily much prolonged.

It will be seen that my invention provides a process whereby formic-aldehyde disinfection can be economically and conveniently accomplished, that by the improved process all of the formic-aldehyde vapors can be evolved from the source of formic aldehyde, and that the vapors will be thrown off in unpolymerized and non-aqueous form and with sufficient rapidity to enable an equal and effective disinfection to be made.

Those matters disclosed in my hereinbefore-mentioned foreign patents which are not herein disclosed and claimed are not hereby dedicated to the public, but are claimed in applications divisional of my present application—namely, Serial No. 664,394, filed December 29, 1897; Serial No. 724,965, filed July 24, 1899, and Serial No. 21,756, filed June 27, 1900.

What I claim is—

1. The improved process of producing formic-aldehyde vapors, which consists in subjecting a substance containing formic aldehyde to pressure, and evolving stable depolymerized vapors therefrom while such substance is under pressure, and discharging the compressed vapors in the air.

2. The improved process of producing stable depolymerized formic-aldehyde vapors, which consists in subjecting polymerized formic aldehyde to heat and pressure while evolving vapors therefrom, and discharging such vapors under pressure.

3. The improved method of producing stable formic-aldehyde vapors, which consists in heating a formic-aldehyde solution and preventing polymerization during heating by confining the vapors and solution under pressure and discharging such vapors.

4. The improved method of producing formic-aldehyde vapors, which consists in heating a formic-aldehyde solution and preventing polymerization during heating by confining the vapors and solution under a pressure of at least two atmospheres and discharging such vapors.

5. The improved process of producing formic-aldehyde vapors which consists in subjecting an aqueous solution of formic aldehyde to pressure, whereby to raise its boiling-point to above 100° centigrade and heating it to a temperature intermediate of such higher boiling-point and 100° centigrade, whereby the formic aldehyde is evolved without boiling of the solution, and discharging the stable formic-aldehyde vapors thus evolved.

In witness whereof I have hereunto signed my name in the presence of two subscribing witnesses.

JEAN JOSEPH AUGUSTE TRILLAT.

Witnesses:
  IRENE PAUL ALBERT BIDET,
  ERNEST ROUXEL.